United States Patent [19]
Zaehring et al.

[11] Patent Number: 4,793,772
[45] Date of Patent: Dec. 27, 1988

[54] METHOD AND APPARATUS FOR COOLING A HIGH PRESSURE COMPRESSOR OF A GAS TURBINE ENGINE

[75] Inventors: Gerhard Zaehring, Woerthsee; Josef Wohlmuth, Puchheim Bhf.; Hans-Juergen Schmuhl, Woerthsee, all of Fed. Rep. of Germany

[73] Assignee: MTU Motoren-Und Turbinen-Union Munchen GmbH, Munich, Fed. Rep. of Germany

[21] Appl. No.: 120,991

[22] Filed: Nov. 16, 1987

[30] Foreign Application Priority Data

Nov. 14, 1986 [DE] Fed. Rep. of Germany ....... 3638961

[51] Int. Cl.$^4$ ............................................. F01D 5/08
[52] U.S. Cl. ...................................... 416/95; 415/175
[58] Field of Search ................. 416/95; 415/175, 176, 415/177, 180; 60/726

[56] References Cited

U.S. PATENT DOCUMENTS

| | | | |
|---|---|---|---|
| 2,750,147 | 6/1956 | Smith | 416/95 X |
| 2,858,102 | 10/1058 | Bloomberg | 416/95 X |
| 3,632,221 | 1/1972 | Uehling | 416/95 X |
| 3,647,313 | 3/1972 | Koff | 416/95 X |
| 3,742,706 | 7/1973 | Klompas | 60/726 |
| 4,657,482 | 4/1987 | Neal | 415/176 |

FOREIGN PATENT DOCUMENTS

| | | | |
|---|---|---|---|
| 978608 | 11/1950 | France | 416/95 |
| 72603 | 4/1983 | Japan | 416/95 |
| 223615 | 12/1942 | Switzerland | 416/95 |
| 225231 | 4/1943 | Switzerland | 416/95 |
| 789197 | 1/1958 | United Kingdom | 416/95 |

OTHER PUBLICATIONS

SNECMA-SCN Prospectus CFM 2074/11/84 Information sheet.

Primary Examiner—Everette A. Powell, Jr.
Attorney, Agent, or Firm—Roberts, Spiecens & Cohen

[57] ABSTRACT

The conical section of the hollow shaft of a high pressure compressor behind the last rotor disc is surrounded by an annular protective shield. The shield serves to protect the hollow shaft and the last rotor disc from the main stream of hot compressed air leaving the compressor. Between the hollow shaft and the heat shield a stream of cooling air is furthermore conducted from the vicinity of the axis to the outer region of the last rotor disc. The stream of air then passes through corresponding circumferentially distributed axial holes in the last rotor disc.

9 Claims, 3 Drawing Sheets

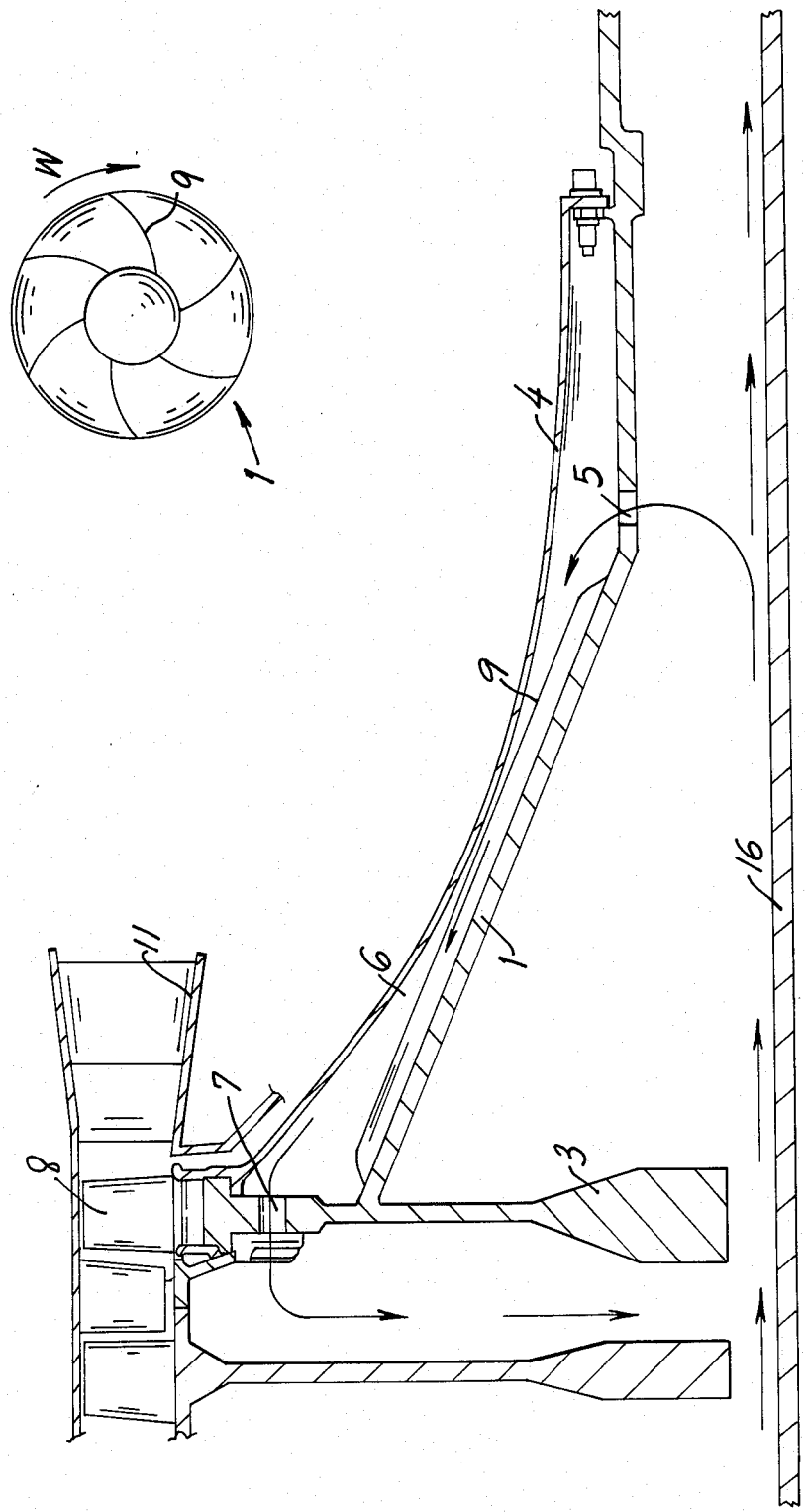

METHOD AND APPARATUS FOR COOLING A HIGH PRESSURE COMPRESSOR OF A GAS TURBINE ENGINE

FIELD OF THE INVENTION

The present invention relates to a gas turbine jet engine having a high pressure compressor whose rotor is constituted substantially as a hollow shaft having a conically tapering section downstream of the last rotor disc of the high pressure compressor, and means for cooling the high pressure compressor by supplying air from a low pressure compressor.

The present invention relates, in particular, to methods and apparatus by which the air supplied rom the low pressure compressor is utilized to cool the high pressure compressor, particularly the disc of the last stage thereof.

PRIOR ART

In SNECMA-SCN Prospectus CFM 2074/11/84, there is shown a gas turbine jet engine whose high pressure compressor is cooled by a stream of air which is diverted from a low pressure compressor and is conducted within the space between the discs of the high pressure compressor and the turbine shaft for cooling a downstream chamber which leads to the turbine. However, the cooling action is insignificant for the radially outer regions of the discs of the compressor. As a result excessive stresses are developed, particularly in the discs of the last stages of the compressor in modern high pressure compression engines due to large radial temperature gradients. The temperature gradients and the resulting stresses are produced by the circulation at the outer periphery of the discs by the hot air in the main stream in the compressor and on the inner periphery by the cooling air.

As a result of the stresses produced thereby, and by centrifugal forces, the compressor discs are highly stressed whereby the last stages of the high pressure compressor are made of heat resistant nickel alloys. However, this has the disadvantage that the compressor becomes high in weight as a result of the large density of the nickel alloys.

SUMMARY OF THE INVENTION

An object of the present invention is to provide a method and apparatus which make it possible also to cool the outer regions of the thermally stressed compressor parts, so that the thermal stresses are reduced and the parts can be made of light weight metals.

This object is achieved in accordance with the invention by a combination of the following features:

(a) a conical heat shield is fastened at an upstream end to the rotor disc of the last compressor stage radially outwards of the conically tapering section of the hollow shaft and at a downstream end to the hollow shaft to form a hollow annular space between the heat shield and the hollow shaft;

(b) the hollow shaft is provided with circumferentially distributed radial holes proximate the attachment thereto of the downstream end of the heat shield for flow therethrough of the cooling air coming from the low pressure compressor into the hollow annular space;

(c) the rotor disc of the last high pressure compressor stage is provided with axial holes proximate its peripheral edge through which the cooling air present in the hollow space can pass;

(d) the annular heat shield extends circumferentially over the entire region of the attachment of the bases of the rotor blades or vanes to the last compressor disc and the heat shield extends radially outwards to the bottom of the blades.

An advantage of the heat shield is that the last compressor disc and the conical hollow shaft are protected from excessive heating by the hot compressor gases which flow therepast. For the cooling of these parts, a circulating stream of cooling air is conducted through the annular hollow space between the hollow shaft and the heat shield, which stream, due to centrifugal force produced by the difference in radii between inlet and outlet openings, is conveyed radially outwards and then into the space between the last two compressor discs.

According to an advantageous embodiment, the heat shield is curved inwardly to provide resistance against the action of the centrifugal force. Since a lower pressure prevails in the annular hollow space than radially outside the heat shield, this pressure difference acts in addition to oppose the effect of the centrifugal force.

In another advantageous embodiment of the invention, a plurality of axially extending circumferentially distributed vane-like ribs are arranged on the outer surface of the conically tapered section of the hollow shaft to increase the circulation of the cooling air. Furthermore, the cooling action is enhanced by the enlarged surface of the hollow shaft.

The ribs are preferably curved in circumferential direction in order to increase the conveying action and the pressure at which the air leaves the hollow space.

According to another advantageous embodiment, only a section of the hollow shaft adjacent to the last rotor disc is surrounded by the annular heat shield. In this way, the temperature gradient over the last rotor disc can be minimized and the heat shield can be provided with a slide surface for a circumferential seal fastened to a casing of a combustion chamber. Thus, hot gases are prevented from entering the hollow space between the hollow shaft and the casing of the combustion chamber, and undue increase in temperature in this region is prevented.

BRIEF DESCRIPTION OF THE FIGURES OF THE DRAWING

The invention will now be described in detail with reference to the embodiments shown in the appended drawing, in FIG. 1 is an axial sectional view through the last stage of a high pressure compressor also illustrating a hollow shaft leading to a high pressure turbine together with one embodiment of heat shield apparatus of the invention;

FIG. 2 is a view similar to FIG. 1 according to a modification in accordance with the invention;

FIG. 3 is a diagrammatic end view of the hollow shaft with ribs in FIG. 2;

DETAILED DESCRIPTION OF PREFERRED EMBODIMENTS

Figure 1:
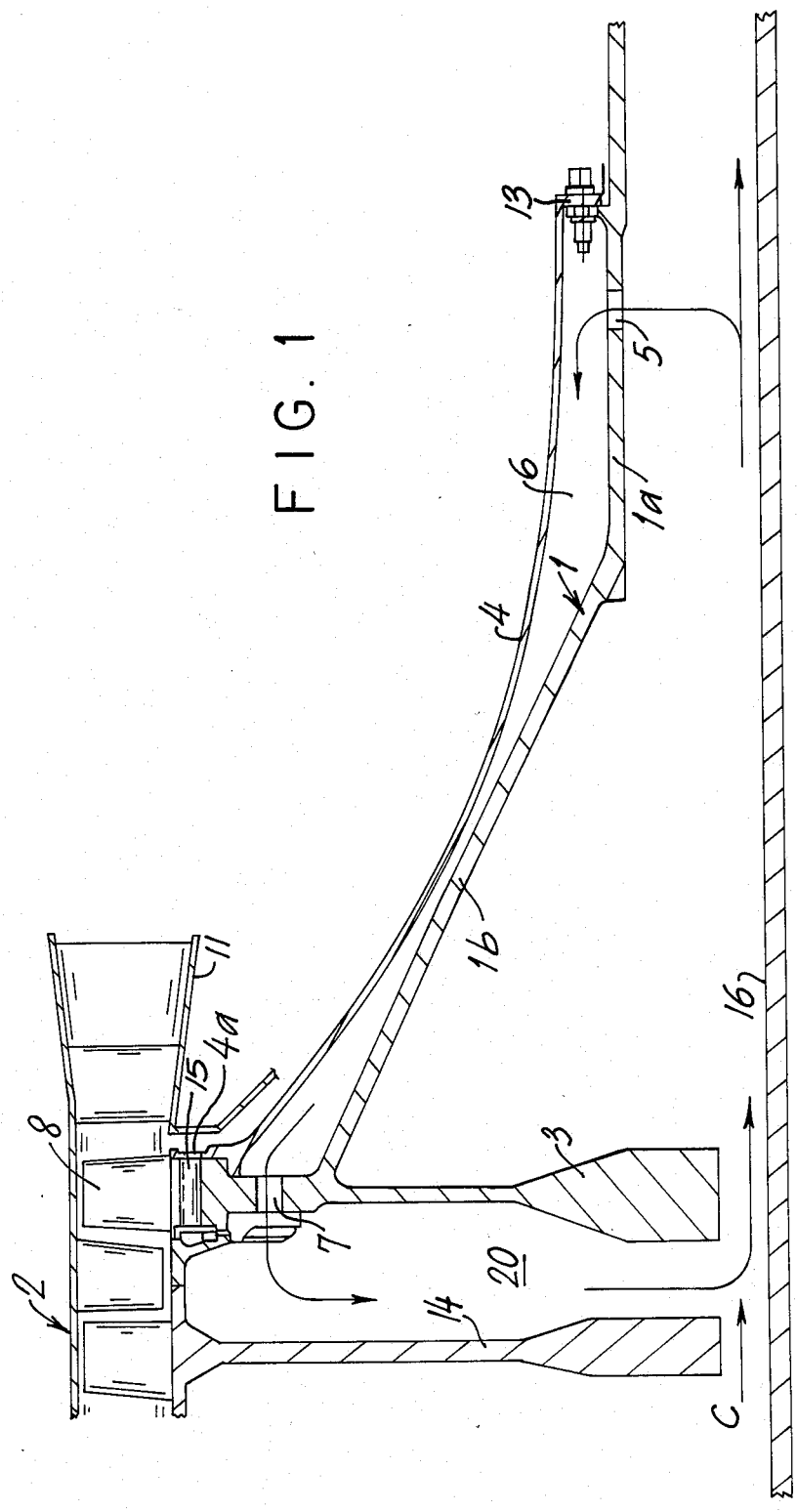

Referring to FIG. 1, therein is seen a rotor of a high pressure compressor 2 which includes a hollow shaft 1 having a cylindrical section 1a connected at its downstream end to a high pressure turbine (not shown) and a conical portion 1b secured to the last rotor disc 3 of the compressor.

The last rotor disc 3 of the compressor carries a plurality of rotor blades or vanes 8 on its periphery and downstream of the blades 8 is an inner casing 11 of a combustion chamber (not shown) to which a main stream of compressed air is supplied from the compressor.

Within the rotor of the high pressure compressor 2 is a shaft 16 which couples a low pressure compressor (not shown) with a low pressure turbine (also not shown). Cooling air C for cooling the discs of the rotor of the high pressure compressor is supplied from the low pressure compressor and travels along a path outside the shaft 16.

In accordance with the invention as shown in FIG. 1, a heat shield 4 is attached at its upstream end to the last rotor disc 3 proximate its outer peripheral edge so as to radially and circumferentially cover the disc 3 in the region at which feet 15 of the blades 8 are engaged in the disc 3 thereby to completely shield the rear of the disc 3 from the stream of hot compressed air which flows therepast from the compressor. Namely, as shown in FIG. 1 the heat shield 4 includes a portion 4a which extends circumferentially around disc 3 and extends radially outwards to the base of the blades 8 whereat they project radially from the disc 3. At its downstream end, the heat shield 4 is fastened at connection 13 to the cylindrical section 1a of the hollow shaft 1. Between the heat shield 4 and the shaft 1 an annular hollow space 6 is defined. In the vicinity of the attachment 13, the hollow shaft 1 is provided with circumferentially distributed radial holes 5 which serve for the entrance of cooling air into the annular hollow space 6. The rearmost rotor disc 3 is provided with circumferentially distributed axial holes 7 proximate its outer periphery which connect the hollow space 6 with a space 20 between the last two rotor discs 3 and 14.

In operation, a portion of the cooling air exiting from the high pressure compressor flows through radial holes 5 into annular space 6 wherein the air flows in reverse axial direction and radially outwards due to the effect of centrifugal force and to the lower pressure prevailing in the hollow annular space 6. The cooling air flows through the axial holes 7 at the periphery of the last disc 3 into space 20 and the air joins with fresh air C coming from the low pressure compressor. A circulating flow of cooling air is thus established.

As shown in FIG. 2, the conical portion 1b of the hollow shaft 1 can be provided with vane-like ribs 9 on its outer surface to enhance the flow of the cooling air in the hollow annular space 6. These ribs 9 can, as shown in FIG. 3, be curved in circumferential direction to impart rotation to the circulating air flow.

Figure 4:
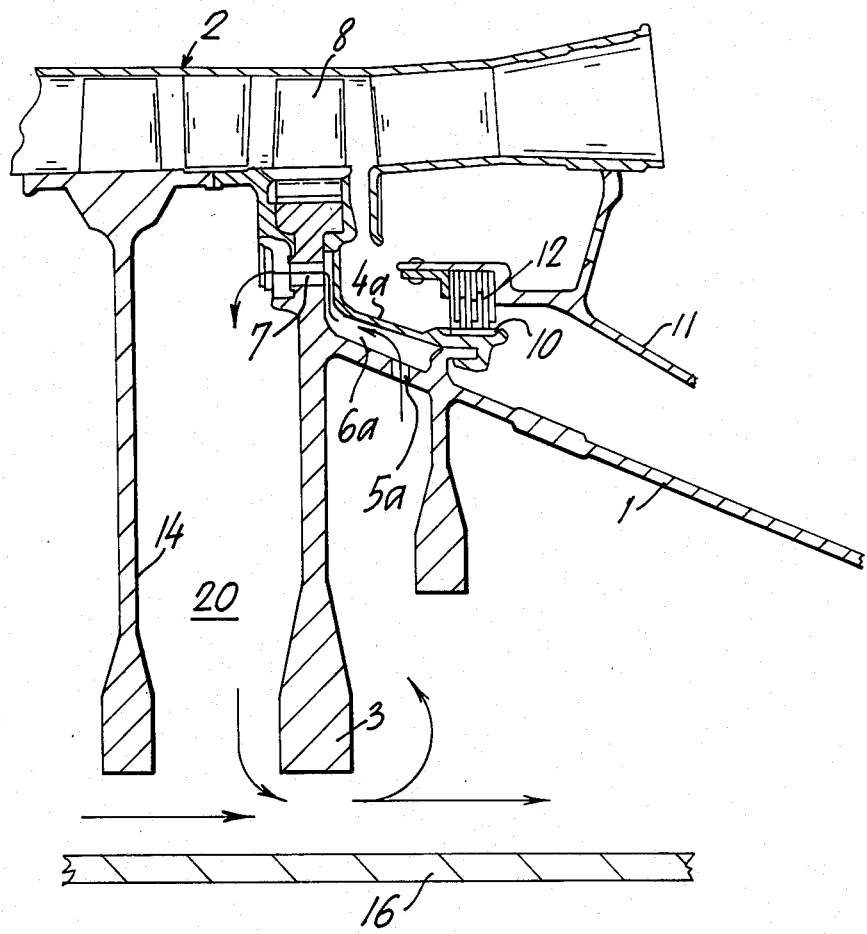
FIG. 4 is a view similar to FIG. 1 according to another embodiment of the invention in which the heat shield is limited to the upstream region of the hollow shaft.

FIG. 4 shows an embodiment in which the heat shield 4a shields only the front part of the hollow shaft 1 and the outer part of the rotor disc 3. In this embodiment, a slide surface 10 for a circumferential seal 12 fastened to the inner casing 11 is provided on the heat shield 4a.

The hollow shaft 1 is provided with circumferentially distributed holes 5a which connect the annular hollow space 6a between hollow shaft 1 and heat shield 4a with the space within the hollow shaft 1. The hollow space 6a is connected with the space 20 between the rotor discs 3, 14 by means of the axial holes 7.

Although the invention has been disclosed in conjunction with specific embodiments thereof, it will become apparent to those skilled in the art that numerous modifications and variations can be made within the scope and spirit of the invention as defined in the attached claims.

What is claimed is:

1. A gas turbine jet engine comprising a high pressure compressor including a rotor and a plurality of rotor discs secured for rotation with the rotor, each disc having an outer periphery and a plurality of rotor blades secured thereto, said blades having respective feet secured in said disc at said periphery thereof, said rotor comprising a hollow shaft including a conical section downstream of the last rotor disc of the high pressure compressor and means for cooling the high pressure compressor by supplying cooling air from a low pressure compressor, characterized as follows:
   (a) a conical heat shield surrounding said conical section of the rotor to define a hollow, annular space therebetween, said heat shield having an upstream end connected to the last rotor disc of the compressor radially outwards of the conical section,
   (b) said hollow shaft being provided with circumferentially distributed holes through which cooling air coming from the low pressure compressor can flow into said hollow annular space;
   (c) said last rotor disc of the high pressure compressor being provided with holes proximate the outer periphery of the disc through which cooling air in said hollow space can flow;
   (d) said annular heat shield covering the entire region at which the feet of the blades ar o secured in the last rotor disc said heat shield including a portion which extends radially outwards of the feet of the blades.

2. A gas turbine jet engine as claimed in claim 1 wherein said heat shield is curved inwardly towards said conical section.

3. A gas turbine jet engine as claimed in claim 1, comprising a plurality of axially extending circumferentially distributed vane-like ribs on the outer surface of the conical section of the hollow shaft in facing relation with said heat shield.

4. A gas turbine jet engine as claimed in claim 3, wherein said ribs are curved in circumferential direction.

5. A gas turbine jet engine as claimed in claim 1 wherein said hollow shaft includes a cylindrical section connected to and extending downstream of said conical section, said heat shield having a downstream end connected to said cylindrical section, said radial holes being located in said cylindrical section.

6. A gas turbine jet engine as claimed in claim 1 wherein said heat shield covers only a portion of said conical section of the hollow shaft proximate the said last rotor disc.

7. A gas turbine jet engine as claimed in claim 6 wherein said heat shield comprises a slide surface, and a stationary circumferential seal slidably engaged on said slide surface.

8. A method of cooling the downstream rotor discs of a multistage high pressure compressor comprising supplying cooling air to a high pressure compressor in a direction headed downstream of successive rotor discs of the compressor, reversing the direction of flow of a portion of the cooling air leaving the compressor so that the reversal portion flows upstream towards the last rotor disc of the compressor, conveying the reversed portion of the cooling air in an enclosed annular region surrounding a conical portion of a shaft of the rotor secured to the last rotor disc, said reversed portion of the cooling air flowing radially outwards towards the periphery of the last rotor disc, and conveying the flowing cooling air through holes formed in said last rotor disc along a circulating path between the last rotor disc and the next rotor disc adjacent thereto to combine with fresh cooling air supplied to the compressor.

9. A method as claimed in claim 8 wherein said reversed portion of the cooling air is impelled in its flow by ribs formed on the outer surface of the conical portion of the shaft.

* * * * *